(12) United States Patent
Wiktorski et al.

(10) Patent No.: US 9,963,830 B2
(45) Date of Patent: May 8, 2018

(54) METHOD FOR PRODUCING A MAT OF CELLULOSE FIBRES WITH A CONTROLLED LEVEL OF MINERAL MATERIAL FOR BITUMEN-IMPREGNATED ROOFING ELEMENTS, AND SUITABLE DEVICE

(71) Applicant: ONDULINE, Levallois-Perret (FR)

(72) Inventors: Waldemar Wiktorski, Tarnow (PL); Andrzej Galica, Mielec (PL)

(73) Assignee: ONDULINE, Levallois-Perret (FR)

( * ) Notice: Subject to any disclaimer, the term of this patent is extended or adjusted under 35 U.S.C. 154(b) by 0 days. days.

(21) Appl. No.: 15/103,975

(22) PCT Filed: Dec. 11, 2014

(86) PCT No.: PCT/FR2014/053278
§ 371 (c)(1),
(2) Date: Jun. 13, 2016

(87) PCT Pub. No.: WO2015/087004
PCT Pub. Date: Jun. 18, 2015

(65) Prior Publication Data
US 2017/0022669 A1  Jan. 26, 2017

(30) Foreign Application Priority Data
Dec. 13, 2013  (FR) .................... 13 62604

(51) Int. Cl.
*D21H 23/50* (2006.01)
*D21H 17/61* (2006.01)
(Continued)

(52) U.S. Cl.
CPC ............. *D21H 23/50* (2013.01); *C08J 3/005* (2013.01); *C08J 5/18* (2013.01); *C08L 1/02* (2013.01);
(Continued)

(58) Field of Classification Search
CPC ........ D21H 23/50; D21H 23/24; D21H 23/26; D21H 17/61; D21H 17/63; D21H 17/67;
(Continued)

(56) References Cited

U.S. PATENT DOCUMENTS 3,287,207 A    11/1966  Treat
6,068,804 A *  5/2000   Betzner .................. D21H 17/61
                                                              162/147
2010/0055485 A1* 3/2010 Malik .................... D21H 17/61
                                                              428/490

FOREIGN PATENT DOCUMENTS

WO      96/00816 A1    11/1996
WO    2006/100607 A2    9/2006

OTHER PUBLICATIONS

International Search Report, dated Feb. 20, 2015, from corresponding PCT Application.

* cited by examiner

*Primary Examiner* — Mark Halpern
(74) *Attorney, Agent, or Firm* — Young & Thompson

(57) ABSTRACT

A method for continuously producing a mat of cellulose fibers intended for producing roofing elements made from bitumen-impregnated cellulose fibers, from a dilute slurry of cellulose fibers spread by a headbox on a dewatering fabric of a forming table having a predefined width, the dewatering fabric moving between an inlet of the forming table at the headbox side and an outlet of the forming table, moving the dilute slurry towards the outlet, gradually removing the liquids of the dilute through the dewatering fabric during the movement to obtain, at the outlet, the mat having a thickness of at least 2 mm, the dilute slurry having a certain level of pre-existing mineral materials. The method involves adding mineral material to the cellulose fibers by spraying a controlled quantity of aqueous solution or dispersion of mineral (Continued)

fillers over the width of the forming table onto the surface of the dilute slurry.

9 Claims, 1 Drawing Sheet

(51) Int. Cl.

| | | |
|---|---|---|
| D21H 17/63 | (2006.01) | |
| D21H 17/67 | (2006.01) | |
| D21H 17/68 | (2006.01) | |
| D21H 23/24 | (2006.01) | |
| D21H 23/26 | (2006.01) | |
| D21H 23/28 | (2006.01) | |
| D06N 5/00 | (2006.01) | |
| C08J 3/00 | (2006.01) | |
| C08J 5/18 | (2006.01) | |
| C08L 1/02 | (2006.01) | |
| C08L 95/00 | (2006.01) | |
| D21H 27/00 | (2006.01) | |

(52) U.S. Cl.
CPC .............. *C08L 95/00* (2013.01); *D06N 5/003* (2013.01); *D21H 17/61* (2013.01); *D21H 17/63* (2013.01); *D21H 17/67* (2013.01); *D21H 17/675* (2013.01); *D21H 17/68* (2013.01); *D21H 23/24* (2013.01); *D21H 23/26* (2013.01); *D21H 23/28* (2013.01); *C08J 2301/02* (2013.01); *C08J 2395/00* (2013.01); *C08J 2401/02* (2013.01); *C08J 2495/00* (2013.01); *C08L 2203/12* (2013.01); *C08L 2203/16* (2013.01); *C08L 2205/16* (2013.01); *D06N 2211/06* (2013.01); *D21H 27/00* (2013.01)

(58) Field of Classification Search
CPC ...... D21H 17/68; D21H 17/675; C08L 95/00; C08L 1/02; C08L 2205/16
USPC ........................................................ 162/171
See application file for complete search history.

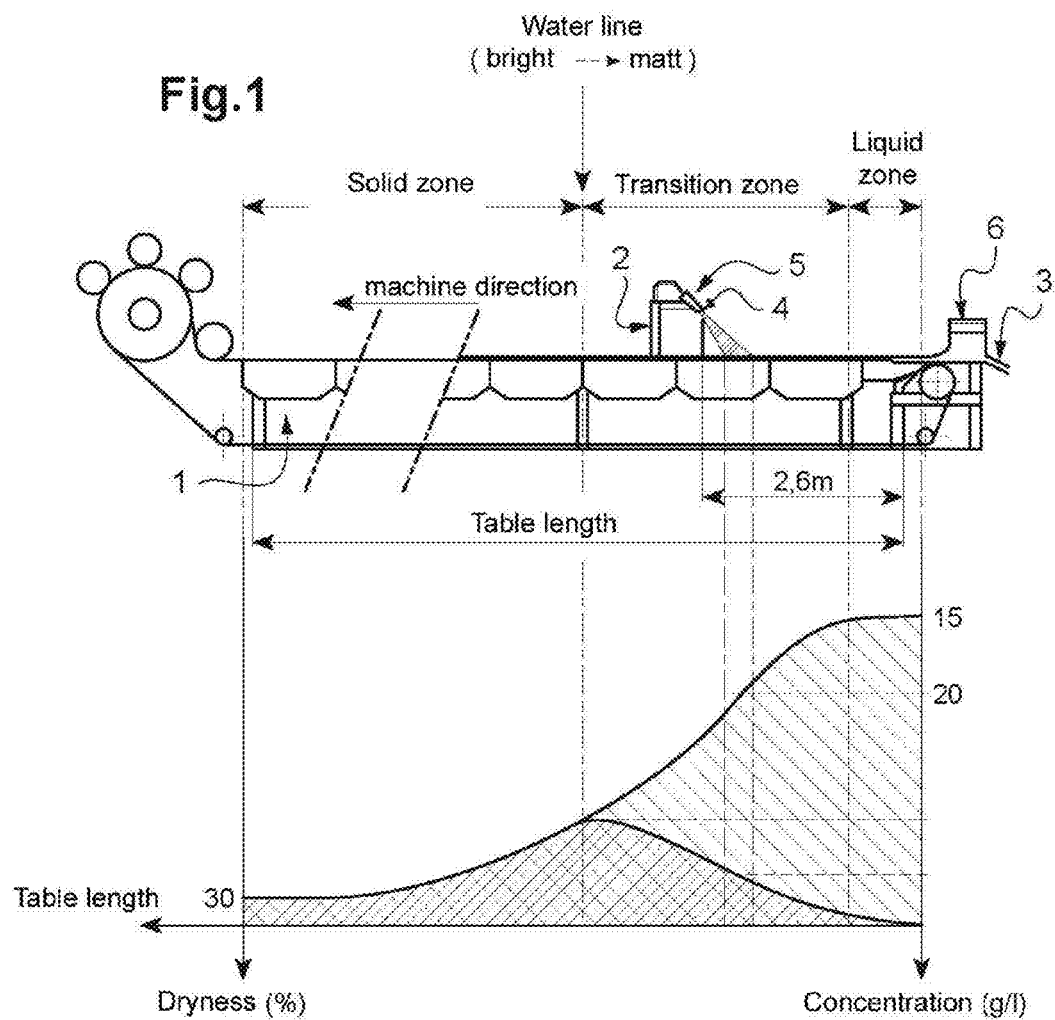
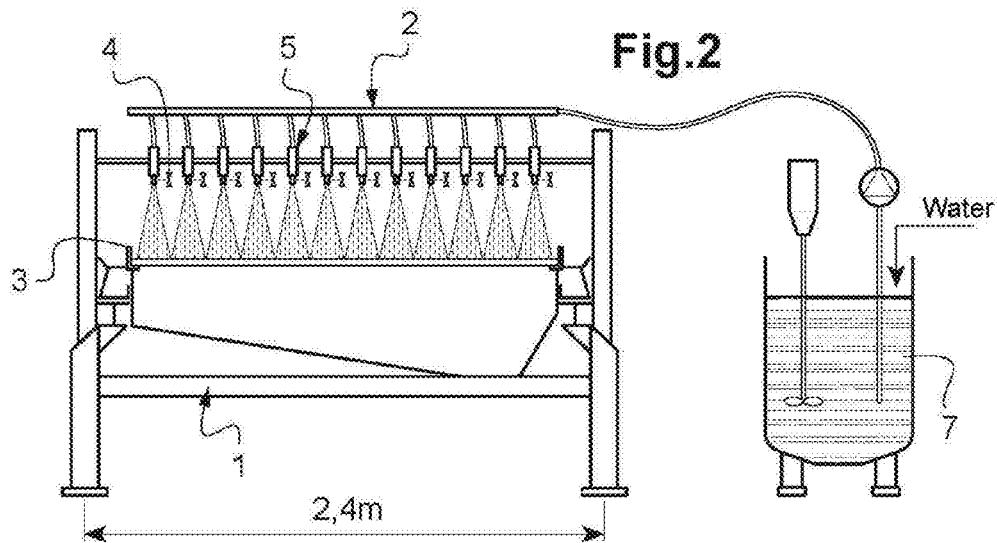

METHOD FOR PRODUCING A MAT OF CELLULOSE FIBRES WITH A CONTROLLED LEVEL OF MINERAL MATERIAL FOR BITUMEN-IMPREGNATED ROOFING ELEMENTS, AND SUITABLE DEVICE

This application is a 371 of PCT/FR2014/053278 filed on 11 Dec. 2014

The present invention relates to a method for manufacturing a mat of cellulosic fibres with a controlled level of mineral materials for roofing elements impregnated with bitumen as well as a device adapted for that purpose. It has applications in the industrial domain of the manufacturing of roofing elements based on cellulose impregnated with bitumen.

The roofing elements made of cellulose fibres impregnated with bitumen to which the invention applies are typically roofing elements such as corrugated sheets, ridge tile or any other useful roofing element. These elements are conventionally made of relatively rigid sheets obtained from a mat of cellulosic fibres. This mat is obtained from a dilute slurry of cellulosic fibres, which is progressively dewatered/dried on a dewatering fabric of a forming table, also called dewatering table, until it forms a coherent/self-supporting mat that is able to undergo the later processing operations. As for it, the dilute slurry of cellulosic fibres is obtained by dilution of the cellulose pulp.

Now, the raw materials implemented in the manufacturing of the cellulose pulp forming the slurry are very diverse and, even in the case where only wood is used, the composition of the cellulose pulp can vary in a non-negligible manner. In particular, the level of mineral materials in the pulp obtained may be relatively variable and cause variations, in particular of the physical characteristics of the roofing elements obtained.

It is hence desirable to be able to control the composition of the elements obtained so that they have stable and determined physical and mechanical characteristics. It is proposed in particular to control the content in total mineral materials in the mat of cellulosic fibres or, more generally, in the finally obtained roofing element, by addition of mineral fillers at a determined stage of the manufacturing of the roofing elements. The stage in question further permits to control the distribution of the added mineral fillers in the thickness of the mat obtained. This stage is that of the dewatering on the forming table.

Indeed, the pulp and hence the diluted slurry of cellulosic fibres has initially a level of pre-existing mineral materials that may be variable and a part of which may in addition be carried along with the liquids, out of the mat, through the dewatering fabric of the forming table. As will be seen, the addition of mineral fillers is made towards the top of the dilute slurry of cellulosic fibres, which lose its liquids on the forming table and it is hence possible to use this fact to act on the distribution of the mineral materials inside and within the thickness of the mat. In particular, the more the addition of mineral fillers is made late, towards the outlet of the forming table, the less these added mineral fillers will be able to go down the dilute slurry of cellulosic fibres, which has still lost a good part of its liquids and it is in this manner that the distribution of the added mineral fillers can also be controlled.

It is known from the documents U.S. Pat. No. 3,287,207, WO96/00816 and WO2006/100607 relating to the fabrication of paper, or even paperboard, methods of addition of mineral products. They are intended to be implemented on a thin layer of cellulosic fibrous material whose thickness is completely different from the thickness of the mat intended for the making of roofing elements.

The invention hence relates to a method for the continuous manufacturing of a mat of cellulosic fibres intended for the making of roofing elements made of cellulose fibres impregnated with bitumen, from a dilute slurry of cellulosic fibres spread by a headbox on a dewatering fabric of a forming table having a determined width, the dewatering fabric moving between an inlet of the forming table on the headbox side and an outlet of the forming table, carrying along the dilute slurry of cellulosic fibres towards the outlet, the liquids of said dilute slurry of cellulosic fibres being gradually removed through the dewatering fabric during said movement in order to obtain at the outlet said mat having a thickness of at least 2 mm, the dilute slurry having a certain level of pre-existing mineral materials.

According to the invention, mineral material is added to the cellulosic fibres by spraying of an aqueous solution or dispersion of mineral fillers, over the width of the forming table, onto the surface of the dilute slurry having already lost a part of its initial liquids, the quantity of mineral fillers added being controlled in order to obtain, in the mat or more generally the roofing element, a determined level of total mineral materials resulting from the addition of the mineral fillers to the pre-existing mineral materials that it was possible to preserve in the mat.

It is understood that, during the dewatering on the forming table, the liquids that are removed carry along with them a part of the pre-existing mineral materials of the dilute slurry of cellulosic fibres and possibly a part of the added fillers. Mineral fillers are hence accordingly added to obtain in the roofing element a determined level of total mineral materials corresponding to what remains/what has been preserved from the pre-existing materials of the slurry and the added fillers. If it can be relatively simple to know the quantity of minerals in the slurry and in the roofing element, for example by sampling and measurement, it is also possible to implement measurement means at the outlet of the forming table. For the aqueous solution or dispersion, this quantity may be measured or known a priori as a function of the proportions of its constituents during its manufacturing.

In various embodiments of the invention, the following means, which can be used alone or in any technically possible combination, are used:

the spraying of the aqueous solution or dispersion of mineral fillers is obtained by implementation of at least one linear spraying ramp arranged over the width of the forming table, transversally to the feeding direction of the dilute slurry of cellulosic fibres, said at least one ramp being arranged at determined height(s) above the dilute slurry of cellulosic fibres spread on the dewatering fabric, the aqueous solution or dispersion of mineral fillers being pressurized for being sprayed through spraying nozzles, the spraying ramp(s) include spraying nozzles,
only one ramp is implemented,
the height of the ramp is fixed,
the height of the ramp is adjustable,
the height of the ramp is variable,
the height of the ramp is variable and controllable by control means,
the/each ramp can pivot about its axis to as to be able to displace the line or zone of impact of the drops of the aqueous solution or dispersion of mineral fillers, sprayed at their arrival on the surface of the dilute slurry having already lost a part of its initial liquids, the pivoting of the ramp about its axis is variable and controllable by control means, the pressure of the aqueous solution or dispersion of mineral fillers for spraying is fixed, the pressure of the aqueous solution or dispersion of mineral fillers for spraying is adjustable, the pressure of the aqueous solution or dispersion of mineral fillers for spraying is variable, the pressure of the aqueous solution or dispersion of mineral fillers for spraying is variable and controllable by control means, the flow rate of spraying of the aqueous solution or dispersion of mineral fillers is fixed, the flow rate of spraying of the aqueous solution or dispersion of mineral fillers is adjustable, the flow rate of spraying of the aqueous solution or dispersion of mineral fillers is variable, the flow rate of spraying of the aqueous solution or dispersion of mineral fillers is variable and controllable by control means, the spraying nozzle forms a fan spray, the spraying nozzle forms a conical spray, the spraying nozzle forms a conical spray whose generating line is a circle or an ellipse, the control means are manual, the control means are semi-automated, measurements of the level of total mineral materials being performed in the mat or the roofing element and the addition of mineral fillers being adjusted or controlled as a function of said measurements, the control means are automated, a sensor measuring in the mat the level of total mineral materials and the control means adjusting or controlling the addition of mineral fillers, the kinetic energy of the drops of aqueous solution or dispersion of mineral fillers, sprayed at their arrival on the surface of the dilute slurry having already lost a part of its initial liquids, is reduced by implementation of mirror nozzles, the mirror nozzles are further of the Venturi effect air suction type, the spraying ramp includes a plurality of spraying nozzles transversally distributed to ensure an overlapping of the impacts of the drops coming from each pair of adjacent nozzles on the surface of the dilute slurry having already lost a part of its initial liquids, the sprays formed by the spraying nozzles are inclined with respect to the vertical and oriented in the direction of displacement of said dilute slurry of cellulosic fibres, from the top to the bottom, the sprays formed by the spraying nozzles are inclined with respect to the vertical and oriented in the direction opposite to the displacement of said dilute slurry of cellulosic fibres, from the top to the bottom, the dilute slurry having already lost a part of its initial liquids, able to receive the spraying of aqueous solution or dispersion of mineral fillers, has a mean mass concentration of solid materials per liter of liquid comprised between 15 g/l and 30 g/l, the dilute slurry having already lost a part of its initial liquids, able to receive the spraying of aqueous solution or dispersion of mineral fillers, is consisted of two distinct phases, 1 liquid phase (dilute slurry) and 1 solid phase (fibrous mat), the 2 phases together having a mass concentration of solid materials per liter of dilute slurry of 20 g/l, the line or zone of impact of the drops of the sprays of the aqueous solution or dispersion of mineral fillers is placed at such a level, along the forming table, that the dilute slurry has lost at least 25% in weight of its initial liquids as they were present at the outlet of the headbox or, in other words, has a mass concentration of solid per liter of dilute slurry higher than 33% with respect to the initial one, the line or zone of impact of the drops of the sprays of the aqueous solution or dispersion of mineral fillers is placed towards the end of the first third of the forming table, starting from the inlet of the forming table, the line or zone of impact of the drops of the sprays of the aqueous solution or dispersion of mineral fillers is placed at such a level, along the forming table, that the essential of the mineral fillers added remains towards the surface of the mat, the part of mineral fillers having been able to diffuse into the thickness of the mat not exceeding half the height of said mat, the mat at the outlet of the forming table passes into a complementary drying station, for a dried mat, i.e. with at least 99% of dryness, of 3 mm thick, 70%+/−10% of the added mineral fillers remain towards the surface of the mat and 30%+/−10% of the added mineral fibres penetrate into the thickness of the mat, said added mineral fillers having penetrated into the thickness of the mat remaining essentially in the first third, i.e. about 1 millimeter, the surface mass of a dry mat, i.e. with at least 99% of dryness, of 3 mm thick, is of about 1350 g/m$^2$, it is added by spraying a quantity of mineral fillers such that the dry mat, i.e. with at least 99% of dryness, includes between 15% and 25% in weight of total mineral materials and, preferably, about 20% in weight of total mineral materials, the dilute slurry of cellulosic fibres at the outlet of the headbox has a density comprised between 12 g/l and 20 g/l, the dewatering fabric of the forming table has a width of about 2.4 m, the dewatering fabric of the forming table has a feeding speed of about 18 m/minute, the forming table includes only one spraying ramp, said ramp including 12 nozzles, the flow rate of each nozzle is of about 40 l/hour, about 40 g/m$^2$ of mineral fillers are added, the mineral material of the mineral fillers is chosen among the kaolin, the calcium carbonate, the talcum, the calcination residues, and the mixture thereof.

The invention also relates to a device for the continuous manufacturing of a mat of cellulosic fibres intended for the making of roofing elements made of cellulose fibres impregnated with bitumen, from a dilute slurry of cellulosic fibres spread by a headbox on a dewatering fabric of a forming table having a determined width, the dewatering fabric moving between an inlet of the forming table on the headbox side and an outlet of the forming table, carrying along the dilute slurry of cellulosic fibres towards the outlet, the liquids of said dilute slurry of cellulosic fibres being gradually removed through the dewatering fabric during said movement in order to obtain at the outlet said mat having a thickness of at least 2 mm, the dilute slurry having a certain level of pre-existing mineral materials, said device including one or several means intended to allow the implementation of the method of the invention.

In particular, the device includes a forming table including spraying means allowing to add mineral material to the cellulosic fibres by spraying an aqueous solution or dispersion of mineral fillers, over the width of the forming table, onto the surface of the dilute slurry having already lost a part of its initial liquids, the quantity of mineral fillers added being controlled in order to obtain, in the mat or more generally in the roofing element, a determined level of total mineral materials resulting from the addition of the mineral fillers to the pre-existing mineral materials that it was possible to preserve in the mat.

In various non-exhaustive variants of implementation of the device invention, the following means, which can be used alone or in any technically possible combination, are used:

the spraying means are at least one spraying ramp, the dewatering fabric of the forming table has a width of about 2.4 m and includes only one spraying ramp arranged over the width, the spraying ramp is fed with pressurized aqueous solution or dispersion of mineral fillers by a pump, the aqueous solution or dispersion of mineral fillers is stored before its pressurization in a continuous agitation or stirring storage tank, the continuous agitation or stirring storage tank also serves as a tank for the preparation of the aqueous solution or dispersion of mineral fillers, from dry material, a preparation tank is connected through a valve to the continuous agitation or stirring storage tank, said preparation tank serving to prepare the aqueous solution or dispersion of mineral fillers, from dry material, filtering means are implemented in the circuit for feeding the aqueous solution or dispersion of mineral fillers, preferably before the pressurization pump, each nozzle of the spraying ramp is controllable individually for one or several of the following functions: spraying or not, flow rate adjustment, the control of each nozzle of the spraying ramp is performed through a valve, wherein said valve can be a tap or a pneumatic valve/electrovalve.

The present invention will now be exemplified, without being limited thereby, by the following description of embodiments and implementations in relation with:

FIG. 1, which shows a forming table on which advances a dilute slurry of cellulosic fibres that is currently losing its liquids and with one spraying ramp arranged above the forming table, a parallel graph showing the concentration in g/l and the dryness level in %, respectively, of the slurry along the table, FIG. 2, which shows a transverse view of the forming table with its spraying ramp and the circuit for feeding the spraying nozzles with the dilute solution of mineral fillers.

In FIG. 1, the forming table 1 is viewed laterally with its spraying ramp 2 of mineral fillers. On this forming table circulates a dewatering fabric covered with a dilute slurry of cellulosic fibres 3 fed and spread more upstream on said dewatering fabric by a headbox 6. In FIG. 1, the dilute slurry of cellulosic fibres 3 that is carried along by the dewatering fabric circulates from the right to the left as indicated by the "machine direction" arrow. The dilute slurry of cellulosic fibres 3 hence includes more liquids on the right side than on the left side because these liquids leak by passing through dewatering fabric. That way, several zones can be distinguished along the forming table 1, between its inlet, on the upstream and headbox side, and its outlet, on the downstream side, firstly a first liquid zone then a transition zone, then a zone qualified as solid zone. In FIG. 1, the limits between these zones have been represented by precise lines but, in practice, it is understood that the passage between two zones is not abrupt. The passage between the transition zone and the solid zone is called water line and corresponds to the passage from a bright aspect to a matt aspect of the surface of the dilute slurry of cellulosic fibres 3.

In this example, the spraying ramp 2 is placed at 2.6 meters from the inlet of the forming table, in the transition zone. It results therefrom that the zone of impact of the drops of the sprays of aqueous solution or dispersion of mineral fillers is located at such a level, along the forming table, that the dilute slurry has lost at least 25% in weight of its initial liquids, which corresponds to a mass concentration of solid per liter of dilute slurry higher than 33% with respect to the initial one, as shown in the following table (values before spraying for the measurements in the spraying zone):

| Component versus location | Headbox | Sraying | Variation |
| --- | --- | --- | --- |
| Water | 985 g | 740 g | −25% |
| Fibres + fillers | 15 g | 15 g | |
| Concentration | 15 g/l | 20 g/l | +33% |

The spraying ramp 2 is a linear ramp that includes a set of aligned spraying nozzles 5 of the mirror type. The ramp 2 for the spraying of mineral fillers is installed on a gantry mounted as a bridge, over and crosswise, perpendicularly, with respect to the circulating dewatering fabric.

By way of example of mirror nozzle, it can be mentioned the flat-spray nozzles of the series K (ref. KWG, KHW, KIW . . . ) of the PNR company, on its website www.pnr-nozzles.com. The spraying ramp 2 allows the spraying of an aqueous solution or dispersion of mineral fillers over the width of the forming table, onto the surface of the dilute slurry having already lost a part of its initial liquids. Each nozzle 5 can be made operative or not and its flow rate can be adjusted individually, thanks to a corresponding tap 4.

As can be seen in FIG. 2, the aqueous solution or dispersion of mineral fillers 7 is pressurized to be sent in the spraying ramp. The aqueous solution or dispersion of mineral fillers 7 is stored, or even prepared, in a tank that includes mixing and stirring means so as to maintain a certain homogeneity in said solution or dispersion.

Due to the inclined orientation of each nozzle 5 to produce a spray from the top and outlet of the table (downstream) to the bottom and inlet of table (on the headbox/upstream side), the fan spray of sprayed drops is hence oriented from the top to the bottom in the direction opposite to the direction of circulation of the dilute slurry of cellulosic fibres 3. A mirror nozzle produces a spray of drops in a direction that is more or less perpendicular to the main axis of the nozzle, according to the structure thereof. Hence, the drops fall on the surface of the dilute slurry of cellulosic fibres 3 more upstream/towards the inlet, on the headbox side, of the table with respect to the place where the spraying ramp 2 is located. Thanks to the use of mirror nozzles, the kinetic energy of the drops arriving onto the surface of the dilute slurry of cellulosic fibres 3 is reduced, which makes it possible to avoid the destructuration of the mat of cellulosic fibres in course of formation.

Preferably, the fan sprays of each nozzle 5 overlap at least in part each other at the place where they arrive on the surface of the dilute slurry of cellulosic fibres 3. Still more preferentially, the overlapping or absence of overlapping—the sprays are only contiguous—is adjusted so that the addition of mineral fillers is homogeneous over the width of the mat. It is understood that this adjustment may be manual or automated and may be obtained in various manner by varying the spraying pressure, the position in height or the orientation of the ramp . . . . In other variants, a tracer or a colorant, visible or not, but which can be detected, is added to the mineral fillers and it is controlled that it is uniformly distributed over the width of the mat. This tracer may be a substance useful for another function but that is detected for the purpose of controlling the spraying uniformity.

The place along the forming table 1 where the drops arrive on the surface of the dilute slurry of cellulosic fibres 3 may be chosen according to various criteria. In all the cases, it is avoided to add mineral fillers too much towards the beginning of the forming table because the dilute slurry of cellulosic fibres 3 is still too wet/liquid. Likewise, it is avoided to add mineral fillers too much towards the end of the forming table because the dilute slurry of cellulosic fibres 3 has this time lost too much liquids and the mineral fillers won't be correctly absorbed by the mat, and moreover, the addition of new liquids, which are brought by the spraying, to the dilute slurry of cellulosic fibres 3 that has already lost the most part of its liquids would not be profitable. Hence, the addition of mineral fillers is made whereas the dilute slurry of cellulosic fibres 3 has a mean mass concentration of solid materials per liter of liquid comprised between 15 g/l and 30 g/l, and preferably of 20 g/l.

Thanks to the invention, the total level of mineral materials in the finished product may be controlled and adjusted according to the needs. This control and adjustment may be made automatic or semi-automatic as a function of the availability of a sensor making it possible to measure in continuous or periodically the level of mineral materials in the mat or the finished product. It is understood that the more the measurement is performed upstream, close to the ramp, the more the level of mineral fillers in the production will be stable over time. However, this measurement must not be too close to the ramp in the case where a later loss of liquids would cause modifications of this level after the measurement and except absence of correction for this possible later loss.

The invention claimed is:

1. A method for the continuous manufacturing of a mat of cellulosic fibres from a dilute slurry of cellulosic fibres (3) spread by a headbox (6) on a dewatering fabric (8) of a forming table (1) having a determined width, the dewatering fabric moving between an inlet (6) of the forming table (1) on the headbox side and an outlet (9) of the forming table, carrying along the dilute slurry of cellulosic fibres (3) towards the outlet, the liquids of said dilute slurry of cellulosic fibres being gradually removed through the dewatering fabric during said movement in order to obtain at the outlet said mat, the dilute slurry (3) having a certain level of pre-existing mineral materials and mineral material is added to the cellulosic fibres by spraying with sprays of an aqueous solution or dispersion of mineral fillers, over the width of the forming table, onto the surface of the dilute slurry having already lost a part of its initial liquids, wherein the mat of cellulosic fibres is intended for the making of roofing elements made of cellulose fibres impregnated with bitumen and has a thickness of at least 2 mm at the outlet of the forming table (1), the line or zone of impact of the drops of the sprays of aqueous solution or dispersion of mineral fillers on the dilute slurry is placed at such a level, along the forming table, that the dilute slurry has lost at least 25% in weight of its initial liquids as they were present at the outlet of the headbox or has a mass concentration of solid per liter of dilute slurry higher than 33% with respect to the initial one, the quantity of added mineral fillers is controlled in order to obtain in the roofing element a determined level of total mineral materials resulting from the addition of the mineral fillers to the pre-existing mineral materials that it was possible to preserve in the mat, said control leading in producing a dry mat, with at least 99% of dryness, including between 15% and 25% in weight of total mineral materials, the sprays formed by the spraying nozzles are inclined with respect to the vertical and oriented in the direction of, or opposite to the direction of, displacement of said dilute slurry of cellulosic fibres, from the top to the bottom, and the kinetic energy of the drops of the sprayed aqueous solution or dispersion of mineral fillers at their arrival on the surface of the dilute slurry having already lost a part of its initial liquids is reduced by implementation of mirror nozzles (5).

2. The method according to claim 1, wherein the spraying of the aqueous solution or dispersion of mineral fillers is obtained by implementation of at least one linear spraying ramp (2) arranged over the width of the forming table (1), transversally to the feeding direction of the dilute slurry of cellulosic fibres, said at least one ramp being arranged at determined height(s) above the dilute slurry of cellulosic fibres (3) spread on the dewatering fabric, the aqueous solution or dispersion of mineral fillers being pressurized for being sprayed through spraying nozzles (5).

3. The method according to claim 1, wherein the spraying ramp (2) includes a plurality of spraying nozzles (5) transversally distributed to ensure an overlapping of the impacts of the drops coming from each pair of adjacent nozzles on the surface of the dilute slurry having already lost a part of its initial liquids.

4. The method according to claim 1, wherein the sprays formed by the spraying nozzles are inclined with respect to the vertical and oriented in the direction opposite to the direction of displacement of said dilute slurry of cellulosic fibres, from the top to the bottom.

5. The method according to claim 1, wherein the dilute slurry having already lost a part of its initial liquid, able to receive the spraying of aqueous solution or dispersion of mineral fillers, has a mean mass concentration of solid materials per liter of liquid comprised between 15 g/l and 30 g/l.

6. The method according to claim 1, wherein the line or zone of impact of the drops of the sprays of aqueous solution or dispersion of mineral fillers is placed at such a level, along the forming table, that the essential of the mineral fillers added remains towards the surface of the mat, the part of mineral fillers having been able to diffuse into the thickness of the mat not exceeding half the height of said mat.

7. The method according to claim 1, wherein it is added by spraying a quantity of mineral fillers such that the dry mat, with at least 99% of dryness, includes about 20% in weight of total mineral materials.

8. The method according to claim 1, wherein the mineral material of the mineral fillers is selected from the group consisting of kaolin, calcium carbonate, talcum, calcination residues, and mixtures thereof.

9. The method according to claim 1, wherein the sprays formed by the spraying nozzles are inclined with respect to the vertical and oriented in the direction of displacement of said dilute slurry of cellulosic fibres, from the top to the bottom.

* * * * *